United States Patent
Wajs

(10) Patent No.: US 8,582,814 B2
(45) Date of Patent: Nov. 12, 2013

(54) IMAGE PROCESSING METHOD AND SYSTEM

(75) Inventor: Andrew Augustine Wajs, Haarlem (NL)

(73) Assignee: Active Optics Pty Limited, Carlingford (AU)

(*) Notice: Subject to any disclaimer, the term of this patent is extended or adjusted under 35 U.S.C. 154(b) by 0 days.

(21) Appl. No.: 13/335,214

(22) Filed: Dec. 22, 2011

(65) Prior Publication Data
US 2012/0093437 A1   Apr. 19, 2012

Related U.S. Application Data

(63) Continuation of application No. 12/090,002, filed as application No. PCT/EP2005/055179 on Oct. 12, 2005, now abandoned.

(51) Int. Cl.
*G06K 9/00* (2006.01)

(52) U.S. Cl.
USPC .......................................... 382/103

(58) Field of Classification Search
USPC .................... 382/103, 141–152, 287, 294
See application file for complete search history.

(56) References Cited

U.S. PATENT DOCUMENTS

| | | | |
|---|---|---|---|
| 4,926,489 A * | 5/1990 | Danielson et al. | 382/144 |
| 5,973,733 A | 10/1999 | Gove | |
| 6,018,368 A * | 1/2000 | Kim et al. | 375/240.24 |
| 6,178,268 B1 * | 1/2001 | Furukawa et al. | 382/260 |
| 6,560,375 B1 | 5/2003 | Hathaway et al. | |
| 6,665,450 B1 * | 12/2003 | Cornog et al. | 382/276 |
| 6,778,210 B1 | 8/2004 | Sugahara et al. | |
| 2003/0035583 A1 * | 2/2003 | Pelagotti et al. | 382/217 |
| 2003/0039404 A1 * | 2/2003 | Bourret | 382/294 |

FOREIGN PATENT DOCUMENTS

| | | |
|---|---|---|
| EP | 1 117 251 A1 | 7/2001 |
| WO | WO 2005/064919 A1 | 7/2005 |

OTHER PUBLICATIONS

Jens-Rainer Ohm:, "Multimedia Communication Technology", 2004, Springer, Heidelberg, DE, XP002367540, pp. 590-606.
Peter Symes:, "Digital Video Compression", 2003, McGraw-Hill, New York, XP002367541, pp. 137-150.
Chan et al., "Variable size block matching motion compensation with applications to video coding", IEE Proceedings-I. Solid-State & Electron Devices, Institution of Electrical Engineers. Stevenage, GB, vol. 137, No. 4, Part I, Aug. 1, 1990, pp. 205-212.

* cited by examiner

*Primary Examiner* — Alex Liew
(74) *Attorney, Agent, or Firm* — Nixon Peabody LLP; Jeffrey L. Costellia

(57) ABSTRACT

In an image processing method a sequence of at least two image frames is provided and a motion vector representing relative movement of at least a part of said image frames is calculated. At least said part in the image frames is repositioned in accordance with the calculated motion vector, and the image frames are combined to form a combined image frame. The image frames are divided into blocks and a block motion vector representing relative movement of each block is calculated. Each block is repositioned in accordance with the calculated block motion vector and the blocks are combined to form combined blocks in order to obtain the combined image frame.

11 Claims, 2 Drawing Sheets

IMAGE PROCESSING METHOD AND SYSTEM

The invention relates to an image processing method, comprising, providing a sequence of at least two image frames, calculating a motion vector representing relative movement of at least a part of said image frames, repositioning at least said part in the image frames in accordance with the calculated motion vector, and combining the image frames to form a combined image frame. The invention further relates to an image processing system, a computer program configured to enable a programmable processing device to carry out the method and a digital camera comprising an image processing system. Such an imaging processing method and system are described in the international patent application PCT/EP04/05108. As described in this application, the image processing method and system can be used for example in a digital camera. Although the known method and system generally provide combined image frames of high quality, complex movement of the camera including rotation and translation can require significant processing to align the images and may require up scaling of the image which is very costly with respect to computation. Moreover, in case of complex movement including rotation and translation, the known method and system may result in misalignments which can not be compensated.

The invention aims to provide an improved image processing method and system of the above-mentioned type.

To this end the image processing method according to the invention is characterized by dividing the image frames into blocks, calculating a block motion vector representing relative movement of each block, repositioning each block in accordance with the calculated block motion vector and combining the blocks to form combined blocks in order to obtain the combined image frame.

The image processing system for forming a combined image from a plurality of image frames comprises an arrangement for loading an array of pixel values of a first image and at least an array of pixel values of one further image, the image processing system being configured to perform the steps of calculating a motion vector representing relative movement of at least a part of said image frames, repositioning at least said part in the image frames in accordance with the calculated motion vector, and combining the image frames to form a combined image frame.

According to the invention the image processing system is further configured to divide the image frames into blocks, to calculate a block motion vector representing relative movement of each block, to reposition each block in accordance with the calculated block motion vector and to combine the blocks to form combined blocks in order to obtain the combined image frame.

In this manner a method and system are obtained, wherein the image is broken down into blocks and a block motion vector is calculated for each block. The blocks of at least a second image frame are moved to align with the blocks of a first image frame, whereafter the blocks are combined to obtain a combined image frame having a high image quality. The method of the invention allows simpler motion models to be computed in specific regions of the image rather than requiring a highly exact complex model to be computed for the entire image. Up scaling of an image frame for alignment purposes is not necessary.

The invention will now be explained in further detail with reference to the accompanying drawings, in which FIG. 1 shows schematically the layout of an exemplary digital camera;

Figure 4:
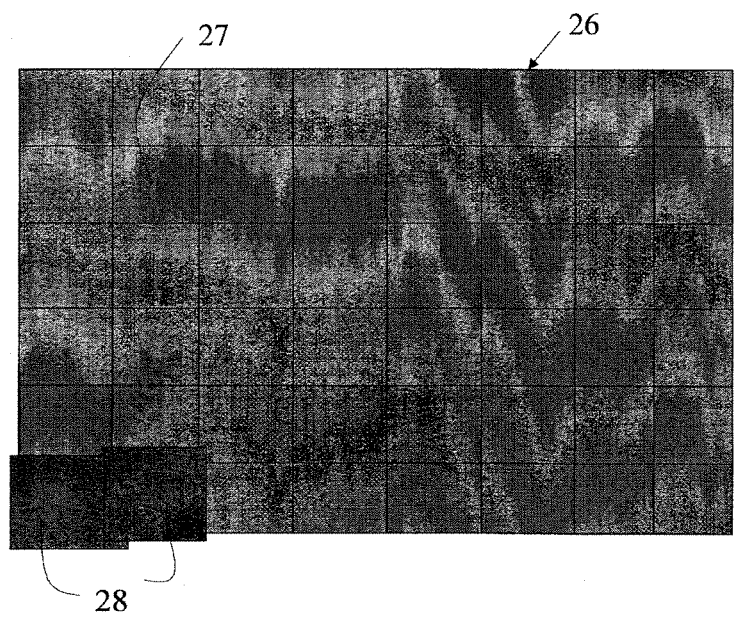

FIG. 4 schematically shows a first image divided into blocks and two blocks of a second image aligned with the blocks of the first image.

One example of an image processing system usable in the context of the method outlined herein is part of a digital camera 1. Other examples of application of the image processing system and method include a photocopier, scanning device and a personal computer or workstation.

The digital camera 1 comprises a lens system 2 for focussing on one or more objects in a scene. When a shutter 3 is opened, the scene is projected through an aperture 4 onto a photosensitive area 5 (FIG. 2) of an image-capturing device 6. The shutter time is controllable, as is the diameter of the aperture. As an alternative, or addition, to the shutter 3, the image capturing device could be electronically controlled to provide the same effect (electronic shutter). The image-capturing device 6 can be device implemented in Complementary Metal-Oxide Semiconductor (CMOS) technology, or a Charge-Coupled Device (CCD) sensor.

Figure 2:
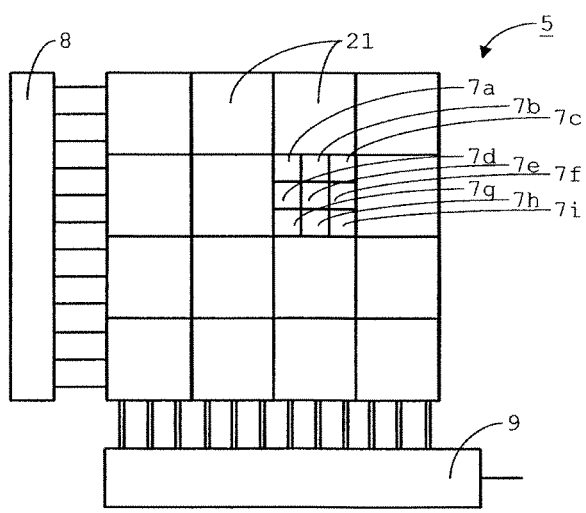
FIG. 2 shows in very schematic fashion some components of an image capturing device in the camera.
Figure 3:
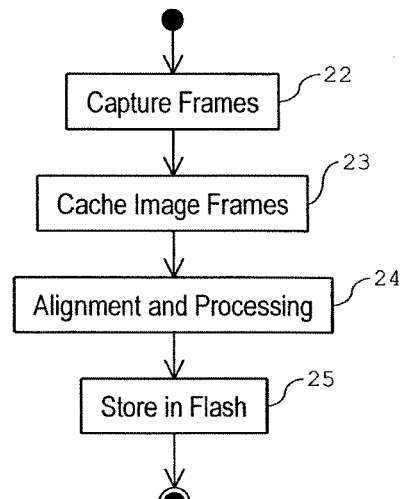
FIG. 3 is a flow diagram illustrating a method of capturing image frames and forming a combined final image.

Referring to FIG. 2, the photosensitive area 5 is divided into areas occupied by pixel cells 7$a$-$i$, of which only nine are shown for clarity. Each pixel cell 7 includes a device for generating a signal indicative of the intensity of light to which the area that it occupies within the photo-sensitive area 5, is exposed. It is noted that the devices occupying the pixel cells 7$a$-$i$ are generally provided as components of one integrated circuit. An integral of the signal generated by a device is formed during exposure, for example by accumulation of photocurrent in a capacitor. Subsequent to exposure of the photo-sensitive area 5 for the duration of an exposure time interval, the values of the integrals of the generated signals are read out by means of row selection circuit 8 and column selection and readout circuit 9.

It is noted that, for simplicity, this description will not focus on the way in which colour images are captured. It is merely observed that any known type of technology can be used, such as colour filters, a colour-sensitive variant of the image capturing device 6, etc. In this respect, it is also observed that the photosensitive area 5 need not be the surface area of an integrated circuit comprised in an image-capturing device, or at least not for all colour components. Furthermore, although in the present application, image frames will be said to be captured consecutively, this does not preclude embodiments, wherein image frames of different colour components are captured in order, so that 'consecutively' captured image frames detailing one colour component are alternated by those detailing other colour components.

The output of the column select and read-out circuit 9 is provided in the form of one or more analogue signals to an Analogue-to-Digital converter (A/D-converter) 10. The A/D-converter 10 samples and quantises the signals received from the image capturing device 6, i.e. records it on a scale with discrete levels, the number of which is determined by the number of bits of resolution of the digital words provided as output by the A/D converter 10. The A/D converter 10 provides as output an array of pixel values encoding a captured image frame.

A Digital Signal Processor (DSP) 11 performs such features as interpolation between pixels and optionally compression of the image. Each exposure of the image-capturing device during an exposure time interval results in at least one frame.

The digital camera 1 comprises a storage device 12 for storing the image data encoding the captured images or image frames. The storage device can be any usual type of storage device, e.g. built-in flash memory, inserted flash memory modules, a disk drive with a floppy disk, a PCMCIA-format hard disk, or an optical disk drive.

A microprocessor 13 controls the operation of the digital camera 1, by executing instructions stored in non-volatile memory, in this example a Read-Only Memory (ROM) 14. The instructions in ROM 14, in some embodiments in combination with routines programmed for execution by DSP 11, enable the digital camera 1 to execute the image processing and capturing methods outlined in the present application.

Advantageously, the microprocessor 13 communicates with a co-processor 15 in which at least part of an image compression algorithm is implemented in hardware. Algorithms to compress images in accordance with the JPEG-standard are usable, for example. As part of the compression algorithm, the able, for example. As part of the compression algorithm, the image data is transformed into the spatial frequency domain. The co-processor 15 executes at least this transformation, using a Discrete Cosine Transform (DCT) in most cases.

Indications of the operating conditions and settings of the digital camera 1 are provided on an output device 16, for example a Liquid Crystal Display, possibly in combination with a sound-producing device (not illustrated separately).

Figure 1:
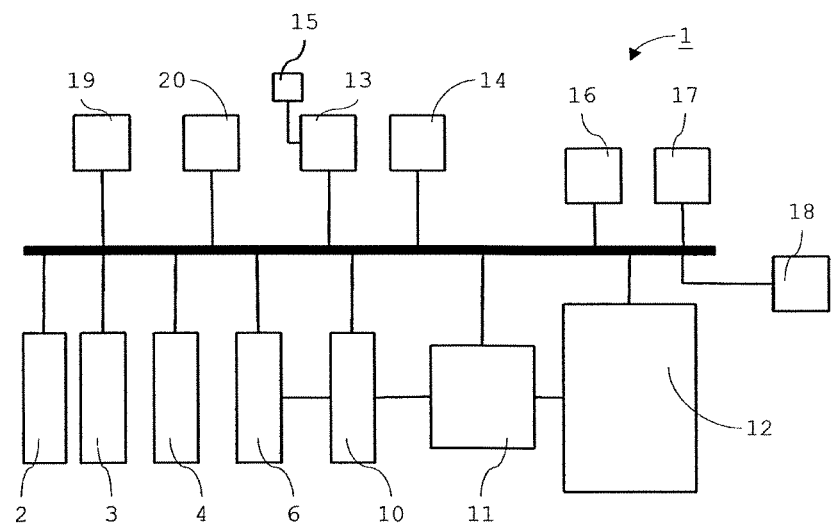

An input device 17 is shown schematically as being representative of the controls by means of which the user of the digital camera provides commands. In addition, the digital camera 1 illustrated in FIG. 1 comprises a flash driver circuit 18 for providing appropriate driving signals to one or more sources of flash lighting. The illustrated digital camera 1 also comprises a motion sensor 19, for providing a signal representative of the movement of the digital camera 1, and thus of the image-capturing device 6. Furthermore, the digital camera 1 comprises an exposure metering device 20. The purpose of the exposure metering device 20 is to measure the strength of the ambient light, so that the microprocessor 13 can determine the intensity of light to be emitted by any connected flash, in combination with the correct values for the settings determining the exposure, which include the exposure time interval for each captured image frame, as will be elaborated on below.

It will be noted that the density of the areas occupied by the pixel cells 7a-i determines the maximum attainable spatial resolution of a captured image frame. The readout time depends on the number of pixel cells. It can be relatively long in embodiments such as the one illustrated in FIG. 2, because each row is selected in turn using row selection circuit 8, whereupon the column selection and readout circuit 9 senses the values of the accumulated photocharge stored in the photodevices in the pixel cells in that row. To reduce the total time involved in repeatedly exposing the photo-sensitive area and capturing an image frame, the spatial resolution can be set to a different value between exposures.

In one embodiment, the microprocessor 13 controls the image-capturing device 6 in such a manner that the one pixel value read out per cluster area 21 represents an integral of the signal generated in one of the pixel cells 7 that lie within the cluster area 21. This embodiment has the virtue that it can be used with any type of image-capturing device 6.

In a preferred embodiment, the image-capturing device 6 has the capability to "bin" the outputs of multiple pixel cells. In this embodiment, the microprocessor 13 directs the image-capturing device 6 to generate an array of pixel values (each value being associated with one of the defined cluster areas 21) in such a manner that each pixel value is representative of the integral of the sum of the signals generated by at least two device in pixel cells that occupy the same defined cluster area 21. In this shown embodiment, this could mean that the pixel value for one cluster area 21 is the sum, or alternatively the average, of the integrals of the signal generated by all nine of the shown pixel cells 7a-7i. This embodiment is preferred, because it increases the sensitivity. Effectively, each pixel value represents the amount of light that fell on the whole of a defined cluster area 21, instead of just on the area occupied by one pixel cell 7. Thus, smaller light fluxes are detectable. Furthermore, binning decreases the amount of noise, i.e. leads to a low resolution image with a higher Signal-to-Noise-Ratio (SNR). As the binning capability is a function of the image-capturing device that is implemented in hardware, binning does not add appreciably to the read out time. As binning results in fewer pixels to be read out, the read out time is actually reduced. Preferably, the number of image frames that are captured at the highest resolution is equal to, more preferably lower than, the number of image frames captured at lower spatial resolutions. A combined final image formed on the basis of such a series of image frames will have a good SNR.

In an embodiment, upon receiving a command from a user to capture an image, the microprocessor 13 controls the digital camera 1 to carry out a series of steps 22-25. A user of the digital camera 1 may input a desired exposure time for a combined final image, together with settings determining the amount of flash light, the diameter of aperture 4 and the sensitivity of the photodevices in the pixel cells 7. In alternative embodiments, the microprocessor determines one or more of these values automatically, using a signal output by the exposure metering device 20, and possibly one or more pre-defined combinations of values. Subsequently, the microprocessor 13, upon receiving a command actually to capture the combined final image, executes a first step 22 of capturing a number of image frames. This step 22 comprises retrieving the desired exposure time for the combined final image, determining the number of image frames to be captured and, for each image frame, calculating exposure settings determining an exposure level applicable to the image frame. The settings include the exposure time interval for the frame. Preferably, the other settings are determined such as to result in exposure time intervals for the image frames that, together, are shorter than the desired exposure time for the combined final image. It is noted that the embodiment in which "binning" is carried out allows a reduction in the exposure time interval applicable to the image frames, because binning increases the sensitivity. Effectively, 'binning' results in the introduction of an extra amplification of the photo-electric signal. The microprocessor 13 advantageously takes account of this. It calculates the length of the exposure time interval applicable to the image frame at a lower spatial resolution value in dependence on the spatial resolution value, i.e. the amount of 'binning'.

When calculating the settings determining the exposure levels applicable to the image frames, the microprocessor 13 preferably implements one or more of the methods outlined in international patent application PCT/EP04/051080. That is, they are calculated such that the total exposure level that is determined as desirable for the combined final image is unevenly distributed over the image frames.

Following the first step 22 in which the image frames are captured, the arrays of pixel values encoding the image frames are cached in a second step 23. Following the second step 23, they are aligned and processed in a third step 24. The combined final image resulting from the third step is stored in storage device 12 in a final step 25. Although the present description will now continue on the assumption that the digital camera 1 carries out all of the steps 22-25, the third and fourth steps 24,25 could be carried out in a separate image processing system, for example a personal computer or workstation. In that case, the second step would involve committing the generated arrays of pixel values to storage in the storage device 12 or transferring them to the computer via a data link (not shown).

The present invention specifically relates to the alignment carried out in the third step 24. In case of complex movements of the digital camera 1, including rotation and translation, an alignment of a sequence of image frames by means of a global motion vector as described in international patent application PCT/EP04/051080 may not provide an accurate alignment over the full image. The image processing method of the invention will be described starting from a sequence of two image frames, wherein preferably a first image frame is a high resolution image frame and the second image frame is a low resolution image frame. However, the sequence of image frames used may comprise any other number of image frames and the image frames may be of the same resolution.

FIG. 4 very schematically shows a first image frame 26 divided into blocks 27 having an initial size of for example 16×16 pixels. A second image frame is divided into blocks 28 of the same size. In FIG. 4, two blocks 28 of the second image frame are shown, which blocks are aligned with the corresponding blocks 27 of the first image frame 26 using the method of the invention. In the alignment process described, the blocks 27 of the high resolution image frame 26 remain fixed relative to each other. The blocks 28 of the low resolution image frame are moved to align with the blocks 27 of the high resolution image frame. To determine the amount of movement of the blocks 28, block motion vectors each representing relative movement of each of the blocks 28, are calculated after dividing the image frames into the blocks 27, 28. Each block 28 is moved or repositioned in accordance with the corresponding calculated block motion vector and the blocks 27, 28 are combined to form combined blocks which provide the combined image frame.

The size of the blocks depends on the amount of variation that requires compensating. In a first embodiment the variation or distribution about the mean of the motion vector across the entire image can be examined. If there is a sizeable variation in the motion vector across the image then the block size can be reduced. A global motion vector can be determined using the method described in the above-mentioned international patent application or by an algorithm known as RANSAC or any other suitable algorithm. The variation in the motion vector is determined by taking sample blocks as reference, which are available as part of the RANSAC algorithm and examining the value of the vector for each sample block with respect to the global motion vector. If the deviation is to large, the size of the blocks is reduced.

In an alternative embodiment a block motion vectors can be determined and if the vector for block A is significantly different than the vector for block B then the block size is reduced to allow for more refined alignment.

In another variant of the invention the magnitude of the differences between the two frames across the image is checked. This can be measured from block to block by comparing the pixel values after alignment of the blocks. If the magnitude of the differences for a block is greater than a particular threshold the blocks may be divided into smaller blocks and the alignment recalculated for the smaller blocks.

It is noted that in case the amount of variation shows that the size of the blocks needs to be reduced, it is possible to reduce the size of all blocks across the entire image or to reduce only the size of a part of the blocks where the variation between the blocks exceeds the threshold used. It is further noted that any combination of the different methods for checking the amount of variation can also be used.

When it has been determined that the amount of variation can be compensated using the initial size of the blocks 27, 28 or a reduced size, the block motion vectors are calculated, if they were not yet determined to check the amount of variation. According to a first embodiment the block motion vectors can be calculated using the single or global motion vector and the position of the respective blocks 27, 28 with respect to the point of the image to which the single motion vector relates. Each block motion vector is interpolated from the global motion vector by calculating the offset of each block caused by the rotation of the image frame. A rotation by a certain angle results in an offset in the x and y domain that is determined by the angle of rotation and the distance of the block from the point of rotation of the image frame.

In a second method a block motion vector is calculated for each of the blocks 28 by using a method according the above-mentioned international patent application or a known method, such a RANSAC or a least mean squares algorithm.

As schematically shown in FIG. 4, repositioning of the blocks 28 may result in an overlap of the blocks 28 at their boundaries. Problems which may occur due to misalignment between the pixels in the boundary areas can be handled in several ways.

As a first option, especially in cases wherein the second and possible further images have a low resolution, it can be assumed that there will be no visible effects of the misalignment of the pixels in the boundaries. The amount of misalignment can be checked by comparing the pixel values of the pixels in the boundary areas. If the amount of misalignment exceeds a threshold value, it can be decided to reduce the size of the blocks to ensure that the transitions are not visible.

As a second option, the pixel values in the boundary areas can be calculated as follows. Each pixel in the boundary areas will have a first value predicted by the one block and a second value predicted by the other block. The final pixel value is calculated by taking the average of the two pixel values. At the corners of four blocks, the pixels may have four predicted values, each corresponding to one of the blocks meeting at the corner. Again the final pixel value is calculated as an average of the four predicted pixel values.

As an improvement of this averaging option, it is possible to weight the average depending on the location of the pixel within the block. For example, a pixel in the boundary between blocks A and B, closer to five pixels into block A will be 90% weighted to the pixel values associated with block A. This will reduce down to 50% at the boundary with block B and then down to 10% five pixels into block B.

In general, an algorithm could be used according to which pixels that are equidistant from the centres of two adjacent blocks can be assigned the average value of the two predicted values. As a pixel lies closer to the centre of one block and further from the centre of the other block, the average is weighted according to the ratio of the distance.

The method described allows simpler motion models to be computed in specific regions of the image rather than requiring a highly exact complex model to be computed for the entire image. Further, if there is motion in the image of a subject, then this motion can be compensated using the method described, as the motion for each individual block can be made different to compensate for the subject motion.

It is noted that the wording motion vector is to be understood as any combination of variables describing motion of an array of one or more pixels.

The invention is not restricted to the above-described embodiments which can be varied in a number of ways within the scope of the invention.

What is claimed is:

1. Image processing method, comprising:
   providing a sequence of at least two image frames
   calculating a motion vector representing relative movement of at least a part of said image frames,
   repositioning at least said part in the image frames in accordance with the calculated motion vector,
   combining the image frames to form a combined image frame,
   dividing the image frames into blocks,
   calculating a block motion vector representing relative movement of each block,
   reducing the size of each block from an initial size to a reduced size when the motion vector calculated for a block of an initial size deviates more than a threshold amount from a global motion vector,
   repositioning each block in accordance with the calculated block motion vector and
   combining the blocks to form combined blocks in order to obtain the combined image frame.

2. Method according to claim 1, wherein the image frames are divided into blocks of an initial size, wherein the block motion vector is determined for at least a plurality of blocks of the initial size and the difference between the block motion vectors is used as a representation of the amount of variation, wherein the image frames are divided into blocks of a reduced size if the amount of variation exceeds a threshold value.

3. Method according to claim 1, wherein the pixel values of corresponding blocks of the sequence of image frames are compared to determine the amount of variation, wherein the image frames are divided into blocks of a reduced size if the amount of variation exceeds a threshold value.

4. Method according to claim 1, wherein a global motion vector is determined for the image frames, wherein a block motion vector for each of the blocks is determined by means of the global motion vector and the position of the block in the image frames.

5. Method according to claim 1, wherein pixel values in the boundary areas of the repositioned blocks are checked for mismatch, wherein if the mismatch between the pixel values exceeds a threshold value the size of the blocks is reduced and the steps to obtain the combined image frame are repeated.

6. Method according to claim 1, wherein the pixel values in the boundary areas of the repositioned blocks are averaged.

7. Method according to claim 6, wherein the pixel values in the boundary areas of the repositioned blocks are averaged according to a weighting algorithm.

8. Method according to claim 1, wherein a high resolution image is used as a first image, wherein the blocks of each further image are repositioned with respect to the blocks of the high resolution image.

9. Computer program residing on a non-transitory computer-readable medium, the computer program configured, when loaded into a programmable processing device, to enable the programmable processing device to process an image with an image processing system for forming a combined image frame from a plurality of image frames, which the image processing system comprises an arrangement for loading an array of pixel values of a first image and at least an array of pixel values of one further image, the image processing system being configured to perform the steps of:
   calculating a motion vector representing relative movement of at least a part of said image frames,
   repositioning at least said part in the image frames in accordance with the calculated motion vector,
   combining the image frames to form a combined image frame, wherein said system is further configured
   to divide the image frames into blocks,
   to calculate a block motion vector representing relative movement of each block,
   to reduce the size of each block from an initial size to a reduced size when the motion vector calculated for a block of an initial size deviates more than a threshold amount from a global motion vector,
   to reposition each block in accordance with the calculated block motion vector and
   to combine the blocks to form combined blocks in order to obtain the combined image frame.

10. Computer program residing on a non-transitory computer-readable medium, the computer program configured, when loaded into a programmable processing device, to enable the programmable processing device to carry out a method according to claim 1.

11. Digital camera comprising an image processing system according to claim 9.

* * * * *

UNITED STATES PATENT AND TRADEMARK OFFICE
CERTIFICATE OF CORRECTION

| | | |
|---|---|---|
| PATENT NO. | : 8,582,814 B2 | Page 1 of 1 |
| APPLICATION NO. | : 13/335214 | |
| DATED | : November 12, 2013 | |
| INVENTOR(S) | : Andrew Augustine Wajs | |

It is certified that error appears in the above-identified patent and that said Letters Patent is hereby corrected as shown below:

On the title page of the patent, under item (73), Assignee, "Active Optics Pty Limited, Carlingford, NSW (AU)" should read --Silvercrest Investment Holdings Limited, Tortola (VG)--

Signed and Sealed this
Twenty-fifth Day of February, 2014

Michelle K. Lee
*Deputy Director of the United States Patent and Trademark Office*